(12) United States Patent
Li et al.

(10) Patent No.: US 11,442,930 B2
(45) Date of Patent: Sep. 13, 2022

(54) METHOD, APPARATUS, DEVICE AND STORAGE MEDIUM FOR DATA AGGREGATION

(71) Applicant: Beijing Baidu Netcom Science Technology Co., Ltd., Beijing (CN)

(72) Inventors: Yanyan Li, Beijing (CN); Jianguo Duan, Beijing (CN); Hui Xiong, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 129 days.

(21) Appl. No.: 17/021,001

(22) Filed: Sep. 15, 2020

(65) Prior Publication Data
US 2021/0191921 A1 Jun. 24, 2021

(30) Foreign Application Priority Data
Jan. 20, 2020 (CN) .......................... 202010067848.1

(51) Int. Cl.
*G06F 16/23* (2019.01)
*G06F 16/215* (2019.01)
*G06Q 30/02* (2012.01)

(52) U.S. Cl.
CPC ........ *G06F 16/2379* (2019.01); *G06F 16/215* (2019.01); *G06Q 30/0201* (2013.01)

(58) Field of Classification Search
USPC ......................................................... 707/703
See application file for complete search history.

(56) References Cited

U.S. PATENT DOCUMENTS

| | | | |
|---|---|---|---|
| 9,792,231 B1 * | 10/2017 | Thompson | H04L 67/10 |
| 2013/0086699 A1 * | 4/2013 | Polis | H04L 67/20 726/29 |
| 2014/0258296 A1 * | 9/2014 | Chen | H04L 43/14 707/737 |
| 2016/0004820 A1 * | 1/2016 | Moore | H04W 4/21 705/3 |
| 2017/0193022 A1 * | 7/2017 | Xu | G06F 16/24556 |

* cited by examiner

*Primary Examiner* — Cam Linh T Nguyen
(74) *Attorney, Agent, or Firm* — Dilworth IP, LLC

(57) ABSTRACT

The present application discloses a method for data aggregation, the method includes: acquiring original data to be aggregated and dividing the original data into at least one first data set; determining whether each of the at least one first data set has a corresponding historical aggregation record; when there is at least one second data set with a historical aggregation record in the at least one first data set, acquiring a historical aggregation result corresponding to each second data set to obtain at least one first aggregation result; performing aggregation on each third data set without a historical aggregation record to obtain at least one second aggregation result; and determining a third aggregation result of the original data according to the at least one first aggregation result and the at least one second aggregation result, and determining a data tag of the original data according to the third aggregation result.

12 Claims, 5 Drawing Sheets ation again on the second data set that has been aggregated, are beneficial to improving reusability of data aggregation results, reducing resource consumption of data aggregation, and improving aggregation efficiency of data aggregation.

METHOD, APPARATUS, DEVICE AND STORAGE MEDIUM FOR DATA AGGREGATION

CROSS-REFERENCE TO RELATED APPLICATIONS

The present application claims priority to Chinese application number 202010067848.1, filed on Jan. 20, 2020, which is incorporated by reference in its entirety.

TECHNICAL FIELD

The present application relates to the field of data processing and, in particular, to a method, an apparatus, a device, and a storage medium for data aggregation.

BACKGROUND

With rapid development of Internet technologies, an explosive growth trend is triggered for data. Data has become an important strategic resource. Corresponding data processing technologies and data processing services have also been rapidly developed.

In related technologies, when using big data to provide decision support, large-scale computing resources and complex computing logic are used for massive data aggregation.

However, the large-scale computing resources require consumption of high operating and maintenance costs, and data aggregation costs are high. At the same time, the use of the large-scale computing resources and the complex computing logic for data aggregation has problems of low operation efficiency and high professional requirements.

SUMMARY

Embodiments of the present application provide a method, an apparatus, a device, and a storage medium for data aggregation, which are used to solve the problems in the prior art that the existing data aggregation method has high consumption of operation resources and low operation efficiency.

In a first aspect, the present application provides a method for data aggregation, including:

acquiring original data to be aggregated and dividing the original data into at least one first data set;

determining whether each of the at least one first data set has a corresponding historical aggregation record;

when there is at least one second data set with a historical aggregation record in the at least one first data set, acquiring a historical aggregation result corresponding to each said second data set to obtain at least one first aggregation result;

performing aggregation on each third data set without a historical aggregation record to obtain at least one second aggregation result; and determining a third aggregation result of the original data according to the at least one first aggregation result and the at least one second aggregation result, and determining a data tag of the original data according to the third aggregation result.

Dividing original data to be aggregated into at least one first data set, and determining a data aggregation result of each said first data set separately are beneficial to effectively improving aggregation efficiency of data aggregation; determining a second data set with a historical aggregation record, and directly acquiring the historical aggregation result of the second data set instead of performing aggre- Furthermore, the dividing the original data into at least one first data set includes:

establishing a first plan tree corresponding to the original data, the first plan tree including at least one first connection node and at least one first aggregation node, one leaf node of the first plan tree constituting one said first aggregation node, and data represented by one said first aggregation node constituting one said first data set.

Establishing a first plan tree corresponding to the original data is beneficial to improving reusability of data aggregation results and improving development efficiency of data aggregation operations.

Furthermore, the establishing a first plan tree corresponding to the original data includes:

acquiring a user-specified data metric for each aggregation in batch aggregation on the original data to constitute a data metric threshold for each of the at least one first data set;

determining a number of node levels of the first plan tree and the at least one first aggregation node according to the data metric threshold for each said first data set; and establishing the first plan tree according to the number of node levels and the at least one first aggregation node.

Determining the first plan tree corresponding to the original data according to a user-specified data metric that is acquired for a single data aggregation. The data metric for the single data aggregation meets users' data processing requirements, and is beneficial to improving processing efficiency of data aggregation.

Furthermore, the determining whether each of the at least one first data set has a corresponding historical aggregation record includes:

determining, according to a preset file path, whether there is a file record corresponding to each of the at least one first aggregation node; and determining that the first aggregation node with the file record has a corresponding historical aggregation record to obtain at least one second aggregation node with a historical aggregation record in the first plan tree, data represented by one said second aggregation node constituting one said second data set.

Determining a second aggregation node with an aggregation record file in the first plan tree and determining that data represented by the second aggregation node has been aggregated have simple operation logic and low professional requirements, and are beneficial to reducing cost consumption of data aggregation.

Furthermore, the performing aggregation on each third data set without a historical aggregation record to obtain at least one second aggregation result includes:

performing trimming on the first plan tree according to the at least one second aggregation node of the first plan tree to obtain a second plan tree; and performing aggregation on each of the at least one third data set according to the second plan tree to obtain at least one second aggregation result.

Performing trimming on the first plan tree according to each said second aggregation node in the first plan tree effectively reduces repetitive work of data aggregation and reduces resource consumption of data aggregation based on efficient use of data aggregation results, and is beneficial to improving aggregation efficiency of data aggregation.

Furthermore, the performing trimming on the first plan tree according to the at least one second aggregation node of the first plan tree to obtain a second plan tree includes:

according to a file record corresponding to each said second aggregation node and the at least one first connection node of the first plan tree, determining, in the file record, a highest-level first connection node corresponding to each said second aggregation node to obtain at least one second connection node corresponding to the at least one second aggregation node; and deleting, in the first plan tree, a child node branch corresponding to each of the at least one second connection node to obtain the second plan tree.

In the preset file path, determining a highest-level first connection node for the second aggregation node with the aggregation record file, and deleting a child node branch corresponding to the high-level first connection node to obtain the second plan tree, where data represented by all aggregation nodes in the second plan tree is unaggregated data, thus consumption of aggregation operations is reduced and operation efficiency is improved.

In a second aspect, the present application provides an apparatus for data aggregation, including:

a first processing unit, configured to acquire original data to be aggregated and divide the original data into at least one first data set;

a second processing unit, configured to determine whether each of the at least one first data set has a corresponding historical aggregation record;

a third processing unit, configured to when there is at least one second data set with a historical aggregation record in the at least one first data set, acquire a historical aggregation result corresponding to each said second data set to obtain at least one first aggregation result;

a fourth processing unit, configured to perform aggregation on each third data set without a historical aggregation record to obtain at least one second aggregation result; and a fifth processing unit, configured to determine a third aggregation result of the original data according to the at least one first aggregation result and the at least one second aggregation result, and determine a data tag of the original data according to the third aggregation result.

Furthermore, first processing unit includes:

a first processing subunit, configured to establish a first plan tree corresponding to the original data, the first plan tree including at least one first connection node and at least one first aggregation node, one leaf node of the first plan tree constituting one said first aggregation node, and data represented by one said first aggregation node constituting one said first data set.

Furthermore, first processing subunit includes:

a first processing module, configured to acquire a user-specified data metric for each aggregation in batch aggregation on the original data to constitute a data metric threshold for each of the at least one first data set;

a second processing module, configured to determine a number of node levels of the first plan tree and the at least one first aggregation node according to the data metric threshold for each said first data set; and a third processing module, configured to establish the first plan tree according to the number of node levels and the at least one first aggregation node.

Furthermore, second processing unit includes:

a second processing subunit, configured to determine, according to a preset file path, whether there is a file record corresponding to each of the at least one first aggregation node; and a third processing subunit, configured to determine that the first aggregation node with the file record has a corresponding historical aggregation record to obtain at least one second aggregation node with a historical aggregation record in the first plan tree, data represented by one said second aggregation node constituting one said second data set.

Furthermore, fourth processing unit includes:

a fourth processing subunit, configured to perform trimming on the first plan tree according to the at least one second aggregation node of the first plan tree to obtain a second plan tree; and a fifth processing subunit, configured to perform aggregation on each of the at least one third data set according to the second plan tree to obtain at least one second aggregation result.

Furthermore, fourth processing subunit includes:

a fourth processing module, configured to according to a file record corresponding to each said second aggregation node and the at least one first connection node of the first plan tree, determine, in the file record, a highest-level first connection node corresponding to each said second aggregation node to obtain at least one second connection node corresponding to the at least one second aggregation node; and a fifth processing module, configured to delete, in the first plan tree, a child node branch corresponding to each of the at least one second connection node to obtain the second plan tree.

In a third aspect, the present application provides an electronic device, including:

at least one processor; and a memory communicatively connected to the at least one processor;

where the memory is stored with instructions executable by the at least one processor, and the instructions are executed by the at least one processor to enable the at least one processor to execute the method as described in any item of the first aspect.

In a fourth aspect, the present application provides a non-transitory computer readable storage medium stored with computer instructions, where the computer instructions are configured to enable the computer to execute the method as described in any item of the first aspect.

By means of acquiring original data to be aggregated and dividing the original data into at least one first data set; determining whether each of the at least one first data set has a corresponding historical aggregation record; when there is at least one second data set with a historical aggregation record in the at least one first data set, acquiring a historical aggregation result corresponding to each said second data set to obtain at least one first aggregation result; performing aggregation on each third data set without a historical aggregation record to obtain at least one second aggregation result; determining a third aggregation result of the original data according to the at least one first aggregation result and the at least one second aggregation result; filtering the second data set with the historical aggregation record in the at least one first data set; and directly acquiring the historical aggregation result of each said second data set instead of performing aggregation again on the second data set that has been aggregated, the method, the apparatus, the device, and the storage medium for data aggregation according to the present application are beneficial to improving reusability of data aggregation results, improving aggregation efficiency of data aggregation, and reducing resource consumption of data aggregation, suitable for large-scale data aggregation.

Other effects possessed by the foregoing optional manners will be described below in conjunction with specific embodiments.

BRIEF DESCRIPTION OF DRAWINGS

The drawings are used to better understand this solution, but do not constitute a limitation of this application. Among them.

DESCRIPTION OF EMBODIMENTS

The following describes exemplary embodiments of the present application with reference to the accompanying drawings, which includes various details of the embodiments of the present application to facilitate understanding. The described embodiments are merely exemplary. Therefore, persons of ordinary skill in the art should know that various changes and modifications can be made to the embodiments described herein without departing from the scope and spirit of the present application. Also, for clarity and conciseness, descriptions of well-known functions and structures are omitted in the following description.

Application scenarios of the present application: with rapid development of Internet technologies, an explosive growth trend is triggered for data. Data has become an important strategic resource. Corresponding data processing technologies and data processing services have also been rapidly developed. In related technologies, when using big data to provide decision support in various applications such as smart cities, Internet of Things, cloud computing and the like, large-scale computing resources and complex computing logic are used for massive data aggregation.

However, the large-scale computing resources require consumption of high operating and maintenance costs, and data aggregation costs are high. At the same time, the use of the large-scale computing resources and the complex computing logic for data aggregation has problems of low operation efficiency and high professional requirements.

The method, the apparatus, the device and the storage medium for data aggregation according to this application are intended to solve the above technical problems.

Figure 1:
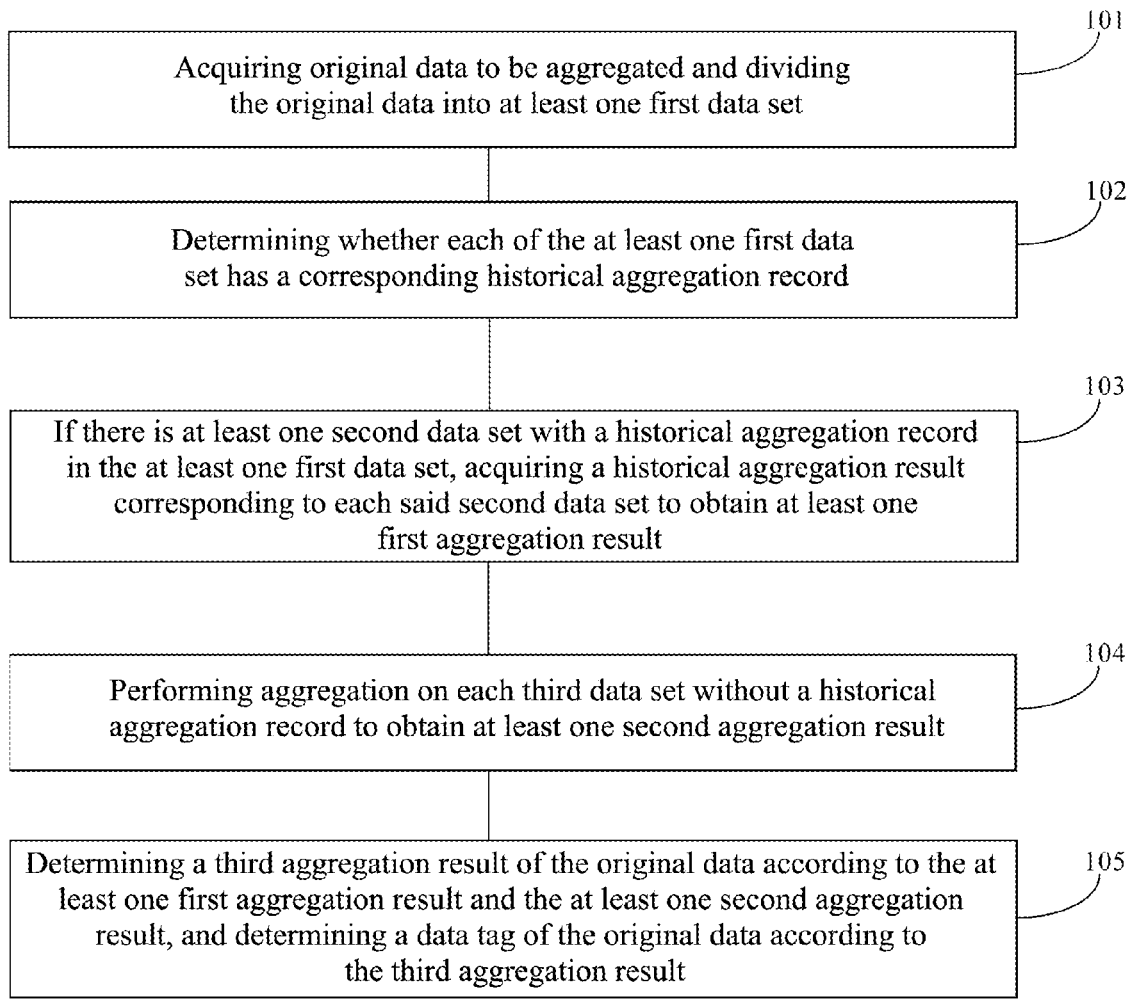
FIG. 1 is a schematic flowchart of a method for data aggregation according to an embodiment of the present application.

FIG. 1 is a schematic flowchart of a method for data aggregation according to an embodiment of the present application. As shown in FIG. 1, the method includes:

Step 101: acquiring original data to be aggregated and dividing the original data into at least one first data set.

In this embodiment, specifically, the execution subject of this embodiment is a terminal device or a server or controller provided on the terminal device, or other apparatus or device that can execute this embodiment. This embodiment is described by taking an example in which the execution subject is a server provided on a terminal device.

Acquiring massive original data to be aggregated, where the original data includes any form of data, for example, the original data is citizens' travel data that is statistically obtained during China's National Day holiday, or is users' webpage browsing records that are obtained within one month. The original data includes a variety of data attributes, which include time information, location information, and data capacity information and the like. Divide the acquired original data to be aggregated into at least one first data set according to a preset data attribute, and each first data set includes at least one piece of data. Exemplarily, dividing users' webpage browsing records that are acquired within one quarter into 15 first data sets according to users' webpage browsing time, where each said first data set includes users' webpage browsing records within a week of the same month. Data aggregation plays an important role in functions such as user demand identification, tag extraction, and information push. By means of aggregating the original data, mining data rules in the massive original data, and using the data rules, decision support is provided for other applications.

Step 102: determining whether each of the at least one first data set has a corresponding historical aggregation record.

In this embodiment, specifically, after the original data is divided into at least one first data set, aggregation on each said first data set may achieve batch aggregation of massive original data; and an overall aggregation result of the original data is obtained by means of re-aggregating aggregation results of the batch aggregation. Before aggregation is performed on each said first data set, determining whether each said first data set has a corresponding historical aggregation record. When there is a first data set with a corresponding historical aggregation record, it means that the first data set has been aggregated; in order to improve aggregation efficiency of data aggregation and reduce resource consumption of data aggregation, aggregation is not performed again on the aggregated first data set.

Step 103: when there is at least one second data set with a historical aggregation record in the at least one first data set, acquiring a historical aggregation result corresponding to each said second data set to obtain at least one first aggregation result.

In this embodiment, specifically, in the at least one first data set, when there is at least one second data set with a historical aggregation record, instead of performing aggregation again on the second data set that has been aggregated, directly acquiring the historical aggregation result of each said second data set to obtain at least one first aggregation result. In the at least one first data set, when there is no second data set with a historical aggregation record, it means each said first data set has not been aggregated, then performing aggregation on each said first data set. In the process of data processing, aggregation may be performed multiple times, and the aggregation record and the aggregation result of each aggregation are saved in a form of file through a preset file path. Different second data sets with historical aggregation records may be aggregated in different data aggregation processes, that is, it is not required that each said second data set be aggregated in the same data aggregation process. This design can improve reusability of data aggregation results, help to improve processing efficiency of data aggregation, save operation costs of data aggregation, and is applicable to aggregation operation of ultra-large-scale data.

Step 104: performing aggregation on each third data set without a historical aggregation record to obtain at least one second aggregation result.

In this embodiment, specifically, in the at least one first data set, performing aggregation on a third data set without a historical aggregation record, that is, performing aggregation on each third data set that has not been aggregated to obtain a second aggregation result of each third data set. The aggregation targets at converting a set of data into one or several values, and using the one or several values to represent the set of data. Common aggregation includes sum( ), mean( ), count( ), wm_concat function, zh_concat Function, listagg function, xmlagg function, sys_connect_by_path function, etc., aggregation can be implemented using methods in the prior art, which will not be repeated in the present application.

Step 105: determining a third aggregation result of the original data according to the at least one first aggregation result and the at least one second aggregation result, and determining a data tag of the original data according to the third aggregation result.

In this embodiment, specifically, after a historical aggregation result of each said second data set is acquired and aggregation on each third data set is performed, performing aggregation again on the obtained at least one first aggregation result and the at least one second aggregation result to obtain an overall aggregation result corresponding to the original data, that is, obtain a third aggregation result of the original data. Exemplarily, preforming aggregation on webpage browsing records that are acquired every week for users in city A to obtain aggregation results of the weekly webpage browsing records for the users in city A, and performing aggregation again on the aggregation results of the weekly webpage browsing records to obtain an overall aggregation result of webpage browsing records within one quarter for the users in city A. Determining a data tag of the original data according to the third aggregation result. Different aggregation indexes are used in an aggregation process, and the obtained aggregation results have different categories. The aggregation results of different categories may be used in different applications. For example, it is possible to create user tags, identify user preferences, and count product feedback and the like according to the overall aggregation result of the original data.

By means of acquiring original data to be aggregated and dividing the original data into at least one first data set; determining whether each of the at least one first data set has a corresponding historical aggregation record; when there is at least one second data set with a historical aggregation record in the at least one first data set, acquiring a historical aggregation result corresponding to each said second data set to obtain at least one first aggregation result; performing aggregation on each third data set without a historical aggregation record to obtain at least one second aggregation result; determining a third aggregation result of the original data according to the at least one first aggregation result and the at least one second aggregation result; filtering the second data set with the historical aggregation record in the at least one first data set; and directly acquiring the historical aggregation result of each said second data set instead of performing aggregation again on the second data set that has been aggregated, this embodiment is beneficial to improving reusability of data aggregation results, improving aggregation efficiency of data aggregation, and reducing resource consumption of data aggregation, suitable for large-scale data aggregation.

Figure 2:
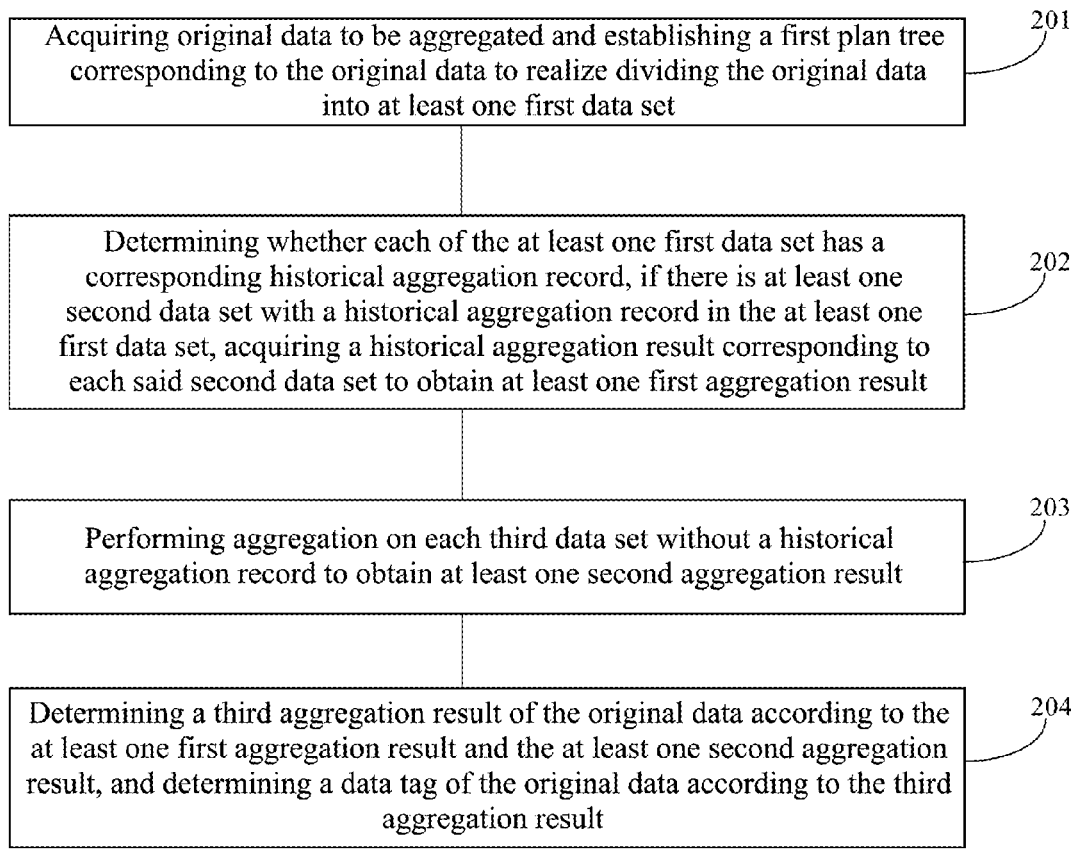
FIG. 2 is a schematic flowchart of another method for data aggregation according to an embodiment of the present application.

FIG. 2 is a schematic flowchart of another method for data aggregation according to an embodiment of the present application. As shown in FIG. 2, the method includes:

Step 201: acquiring original data to be aggregated and establishing a first plan tree corresponding to the original data to realize dividing the original data into at least one first data set.

In this embodiment, specifically, acquiring a user-specified data metric for each aggregation in batch aggregation on the original data to constitute a data metric threshold for each of the at least one first data set; determining a number of node levels of the first plan tree and the at least one first aggregation node according to the data metric threshold for each said first data set; and establishing the first plan tree according to the number of node levels and the at least one first aggregation node, the first plan tree including at least one first connection node and at least one first aggregation node, one leaf node of the first plan tree constituting one said first aggregation node, and data represented by one said first aggregation node constituting one said first data set.

Acquiring a user-specified data metric for each aggregation in batch aggregation, and determining the acquired data metric as a data metric threshold for each aggregation. The data metric includes a time metric, a regional metric, and a volume metric etc., the data metric threshold for each aggregation is a data metric threshold for each first data set. Exemplarily, user A needs to perform aggregation on purchase records that are acquired for customers who purchase goods in his/her supermarket within five months, and specifies that a data metric for each aggregation in batch aggregation is one week, that is, the user specifies to perform aggregation on customers' purchase records within each week separately, and one week is the data metric threshold for each aggregation, that is, an actual time span of purchase records for each aggregation will not exceed one week.

Determining a node level of the first plan tree according to the data metric threshold of each said first data set, where the node level of the first plan tree $L=\log_m^N$, where N is a total data metric of the original data and m is the data metric threshold of the first data set, exemplarily, N is 90 (days) and m is 7 (days), or N is 100 (TB) and m is 2 (TB). When $\log_m^N$ is not an integer, the node level of the first plan tree takes an integer closest to $\log_m^N$ and greater than $\log_m^N$. Determining a data attribute interval for each first aggregation node of the first plan tree according to the data metric threshold of the first data set, and the data attribute interval for each aggregation node matches the data metric threshold. Establishing the first plan tree according to the determined node level of the first plan tree and the at least one first aggregation node.

Figure 2A:
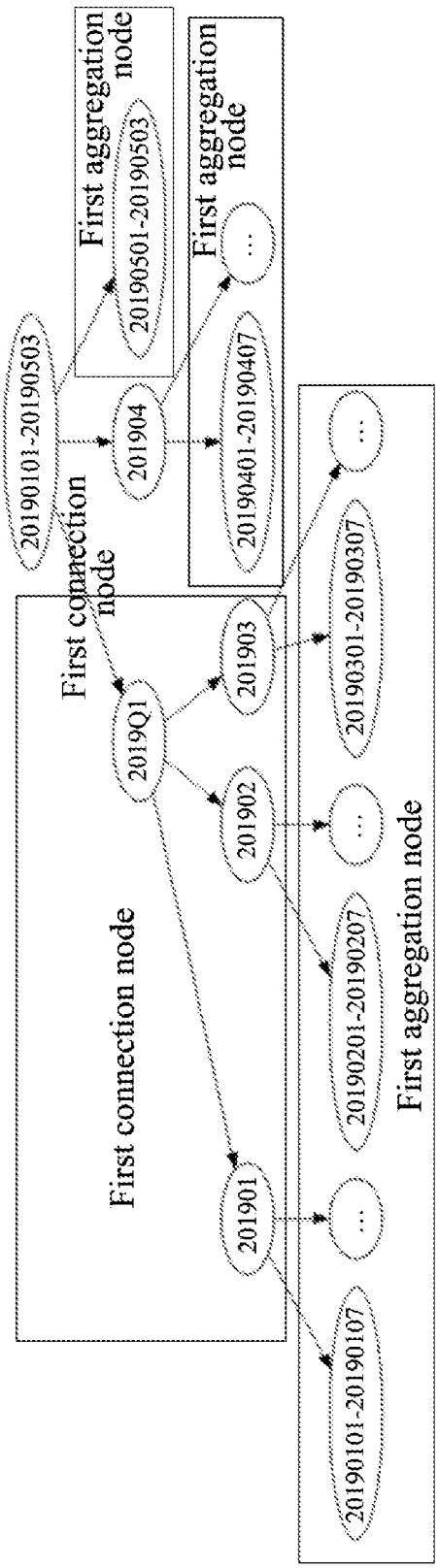
FIG. 2a is a schematic diagram of a first plan tree according to an embodiment of the present application.

Exemplarily, FIG. 2a is a schematic diagram of a first plan tree according to this embodiment. As shown in FIG. 2a, the original data that is acquired is customers' purchase records in each day of a total of 123 days dated from 20190101 to 20190503, a user-specified data metric for each aggregation is 7 days, and the number of node levels of the first plan tree is determined as $\log_7^{123}$, totally 3 levels. A data metric threshold of a first data set is 7 days. Dividing acquired purchase records of users with chronological order based on year, quarter, month, and day to obtain at least one first data set. The $1^{st}$ first data set is purchase records of customers in 20190101-20190107, the $2^{nd}$ first data set is purchase records of customers in 20190108-20190114, . . . , the last first data set is purchase records of customers in 20190501-20190503. Correspondingly, the time attribute of the $1^{st}$ first aggregation node is 20190101-20190107, the time attribute of the $2^{nd}$ first aggregation node is 20190108-20190114, . . ., and the time attribute of the last first aggregation node is 20190501-20190503. Establishing the first plan tree according to the determined node level 3 of the first plan tree and each aggregation node.

Step 202: determining whether each of the at least one first data set has a corresponding historical aggregation record, when there is at least one second data set with a historical aggregation record in the at least one first data set, acquiring a historical aggregation result corresponding to each said second data set to obtain at least one first aggregation result.

In this embodiment, specifically, determining, according to a preset file path, whether there is a file record corresponding to each of the at least one first aggregation node; and determining that the first aggregation node with the file record has a corresponding historical aggregation record to obtain at least one second aggregation node with a historical aggregation record in the first plan tree, data represented by one said second aggregation node constituting one said second data set.

In the process of data processing, multiple times of data aggregation may be performed. An aggregation record and an aggregation result of each aggregation will be saved in a preset file path in a form of file, the saved file having a data attribute index, and a data attribute including a time attribute, a location attribute, a volume attribute, a format attribute, etc. Data corresponding to the data attribute index has a historical aggregation record and a historical aggregation result. In order to improve aggregation efficiency of data aggregation and reduce aggregation costs of data aggregation, aggregation is not performed again on the data corresponding to the data attribute index. Exemplarily, an aggregation record file having a time attribute index of January of 2019 is saved in a preset file path, and the aggregation record file indicates that data related to January of 2019 has been aggregated. In subsequent data aggregation, it is possible to directly acquire a historical aggregation result of the data related to January of 2019. In the preset file path, determining a second aggregation node certainly having a file record from at least one first aggregation node of the first plan tree, and data represented by each second aggregation node constitutes a second data set. For the second aggregation node in the first plan tree, instead of performing aggregation on the data represented by the second data set, acquiring a historical aggregation result corresponding to each said second data set to obtain at least one first aggregation result. In an implementation, in the preset file path, determining an aggregation record file corresponding to a data attribute index that is completely consistent with the data attribute interval of the first aggregation node. When the data attribute index of the aggregation record file is not completely consistent with that of the first aggregation node, it cannot be determined that the first aggregation node has a historical aggregation record. Exemplarily, a data attribute interval of a first aggregation node is 20190101-20190107, while a data attribute index of an aggregation record file is 20190101-20190103; the two are not completely consistent, and it cannot be determined that the first aggregation node has a historical aggregation record, thus it is necessary to perform aggregation on data represented by the first aggregation node.

Step 203: performing aggregation on each third data set without a historical aggregation record to obtain at least one second aggregation result.

In this embodiment, specifically, performing trimming on the first plan tree according to the at least one second aggregation node of the first plan tree to obtain a second plan tree; and performing aggregation on each of the at least one third data set according to the second plan tree to obtain at least one second aggregation result. Specifically, according to a file record corresponding to each said second aggregation node and the at least one first connection node of the first plan tree, determining, in the file record, a highest-level first connection node corresponding to each said second aggregation node to obtain at least one second connection node corresponding to the at least one second aggregation node; and deleting, in the first plan tree, a child node branch corresponding to each of the at least one second connection node to obtain the second plan tree.

The first plan tree includes at least one first connection node and at least one first aggregation node, where the first aggregation node is a leaf node of the first plan tree, and the first connection node is other node apart from a parent node and the leaf node. Data represented by the parent node of the first plan tree is the acquired original data to be aggregated and the at least one first aggregation node of the first plan tree includes at least one second aggregation node with a historical aggregation record and at least one third aggregation node without a historical aggregation record.

After the at least one second aggregation node in the first plan tree is determined, determining, in the preset file path, a highest-level first connection node for the second aggregation node with the aggregation record file, and determining the highest-level first connection node with the aggregation record file as a second connection node of the first plan tree. All leaf nodes corresponding to the second connection node have historical aggregation records, thereby trimming child node branches of the second connection node in the first plan tree to obtain a streamlined second plan tree. Exemplarily, a data attribute interval of a second aggregation node is 20190201-20190207, determining, in the preset file record, a highest-level first connection node for the second aggregation node with the aggregation record file is 201902, and determining 201902 as a second connection node. All leaf nodes corresponding to the second connection node 201902 have historical aggregation records, thereby trimming child node branches of the second connection node 201902 to obtain a second plan tree. Performing aggregation on data represented by each third aggregation node in the second plan tree, that is, performing aggregation on data in each third data set to obtain at least one second aggregation result. This design is beneficial to further improving reusability of data aggregation results, reducing repetitive work of data aggregation, and reducing resource consumption of data aggregation.

Step 204: determining a third aggregation result of the original data according to the at least one first aggregation result and the at least one second aggregation result, and determining a data tag of the original data according to the third aggregation result.

In this embodiment, specifically, for the method and principle of step 204, reference may be made to the description of step 105, which will not be repeated here.

By means of acquiring original data to be aggregated and establishing a first plan tree corresponding to the original data to realize dividing the original data into at least one first data set; determining whether each of the at least one first data set has a corresponding historical aggregation record, when there is at least one second data set with a historical aggregation record in the at least one first data set, acquiring a historical aggregation result corresponding to each said second data set to obtain at least one first aggregation result; performing aggregation on each third data set without a historical aggregation record to obtain at least one second aggregation result; determining a third aggregation result of the original data according to the at least one first aggregation result and the at least one second aggregation result; dividing the original data into the at least one first data set; and determining an aggregation result of each said first data set separately, this embodiment is beneficial to improving aggregation efficiency of data aggregation and ensuring effectiveness of data aggregation work; by means of determining, in all first data sets, a second data set with an historical aggregation record, and not performing aggregation again on the second data set that has been aggregated, this embodiment is beneficial to improving reusability of data aggregation results, can effectively control resource consumption of data aggregation and improve aggregation efficiency of data aggregation, suitable for ultra-large-scale data aggregation work.

Figure 3:
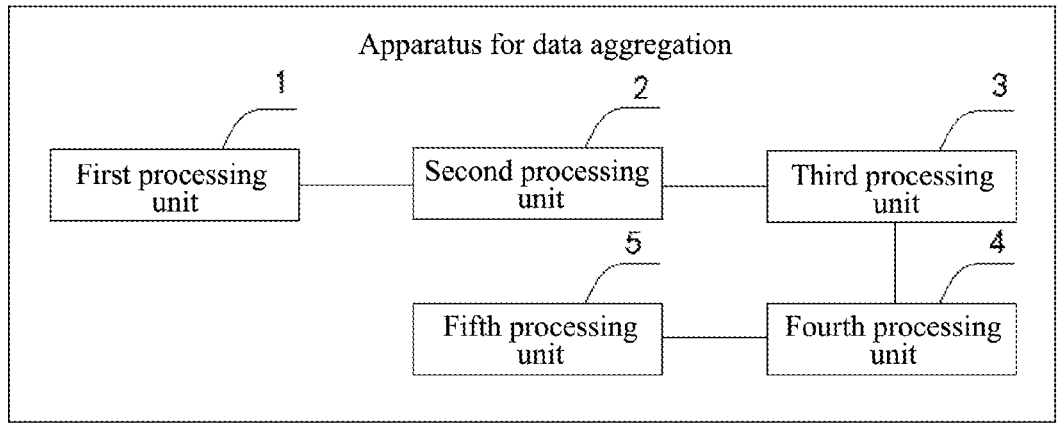
FIG. 3 is a schematic structural diagram of an apparatus for data aggregation according to an embodiment of the present application.

FIG. 3 is a schematic structural diagram of an apparatus for data aggregation according to an embodiment of the present application. As shown in FIG. 3, the apparatus includes:

a first processing unit 1, configured to acquire original data to be aggregated and divide the original data into at least one first data set;

a second processing unit 2, configured to determine whether each of the at least one first data set has a corresponding historical aggregation record;

a third processing unit 3, configured to when there is at least one second data set with a historical aggregation record in the at least one first data set, acquire a historical aggregation result corresponding to each said second data set to obtain at least one first aggregation result;

a fourth processing unit 4, configured to perform aggregation on each third data set without a historical aggregation record to obtain at least one second aggregation result; and a fifth processing unit 5, configured to determine a third aggregation result of the original data according to the at least one first aggregation result and the at least one second aggregation result, and determine a data tag of the original data according to the third aggregation result.

By means of acquiring original data to be aggregated and dividing the original data into at least one first data set; determining whether each of the at least one first data set has a corresponding historical aggregation record; when there is at least one second data set with a historical aggregation record in the at least one first data set, acquiring a historical aggregation result corresponding to each said second data set to obtain at least one first aggregation result; performing aggregation on each third data set without a historical aggregation record to obtain at least one second aggregation result; determining a third aggregation result of the original data according to the at least one first aggregation result and the at least one second aggregation result; filtering the second data set with the historical aggregation record in the at least one first data set; and directly acquiring the historical aggregation result of each said second data set instead of performing aggregation again on the second data set that has been aggregated, this embodiment is beneficial to improving reusability of data aggregation results, improving aggregation efficiency of data aggregation, and reducing resource consumption of data aggregation, suitable for large-scale data aggregation.

Figure 4:
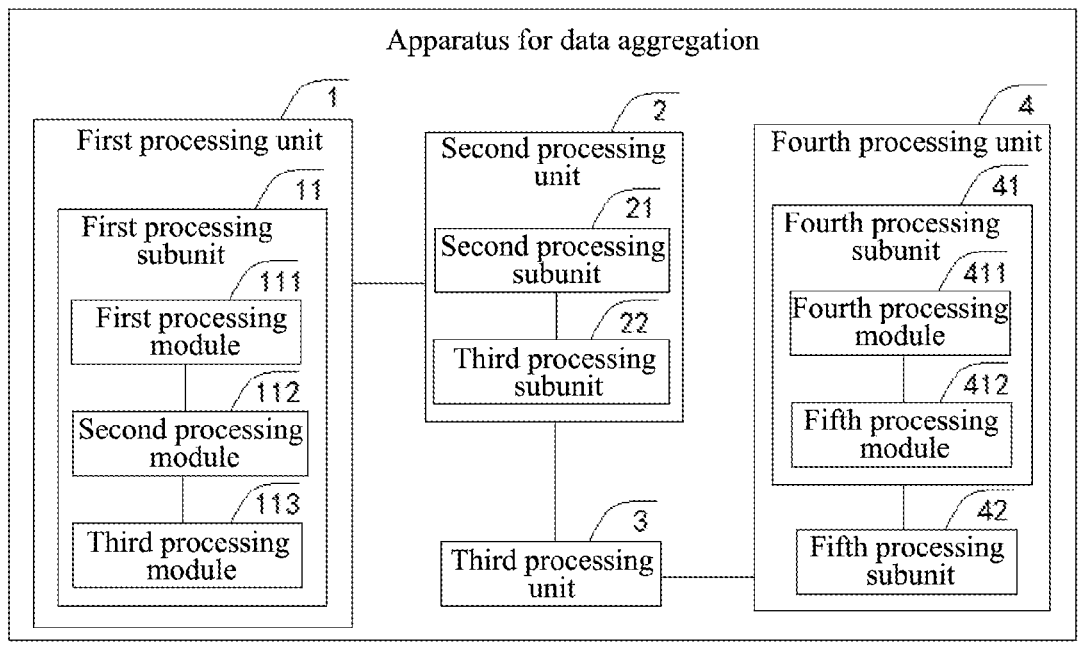
FIG. 4 is a schematic structural diagram of another apparatus for data aggregation according to an embodiment of the present application.

FIG. 4 is a schematic structural diagram of another apparatus for data aggregation according to an embodiment of the present application. Based on FIG. 3, as shown in FIG. 4, the first processing unit 1 includes:

a first processing subunit 11, configured to establish a first plan tree corresponding to the original data, the first plan tree including at least one first connection node and at least one first aggregation node, one leaf node of the first plan tree constituting one said first aggregation node, and data represented by one said first aggregation node constituting one said first data set.

The first processing subunit 11 includes:

a first processing module 111, configured to acquire a user-specified data metric for each aggregation in batch aggregation on the original data to constitute a data metric threshold for each of the at least one first data set;

a second processing module 112, configured to determine a number of node levels of the first plan tree and the at least one first aggregation node according to the data metric threshold for each said first data set; and a third processing module 113, configured to establish the first plan tree according to the number of node levels and the at least one first aggregation node.

The second processing unit 2 includes:

a second processing subunit 21, configured to determine, according to a preset file path, whether there is a file record corresponding to each of the at least one first aggregation node; and a third processing subunit 22, configured to determine that the first aggregation node with the file record has a corresponding historical aggregation record to obtain at least one second aggregation node with a historical aggregation record in the first plan tree, data represented by one said second aggregation node constituting one said second data set.

The fourth processing unit 4 includes:

a fourth processing subunit 41, configured to perform trimming on the first plan tree according to the at least one second aggregation node of the first plan tree to obtain a second plan tree; and a fifth processing subunit 42, configured to perform aggregation on each of the at least one third data set according to the second plan tree to obtain at least one second aggregation result.

The fourth processing subunit 41 includes:

a fourth processing module 411, configured to: according to a file record corresponding to each said second aggregation node and the at least one first connection node of the first plan tree, determine, in the file record, a highest-level first connection node corresponding to each said second aggregation node to obtain at least one second connection node corresponding to the at least one second aggregation node; and a fifth processing module 412, configured to delete, in the first plan tree, a child node branch corresponding to each of the at least one second connection node to obtain the second plan tree.

By means of acquiring original data to be aggregated and establishing a first plan tree corresponding to the original data to realize dividing the original data into at least one first data set; determining whether each of the at least one first data set has a corresponding historical aggregation record, when there is at least one second data set with a historical aggregation record in the at least one first data set, acquiring a historical aggregation result corresponding to each said second data set to obtain at least one first aggregation result; performing aggregation on each third data set without a historical aggregation record to obtain at least one second aggregation result; determining a third aggregation result of the original data according to the at least one first aggregation result and the at least one second aggregation result; dividing the original data into the at least one first data set; and determining the aggregation result of each said first data set separately, this embodiment is beneficial to improving aggregation efficiency of data aggregation and ensuring effectiveness of data aggregation work; by means of determining, in all first data sets, a second data set with a historical aggregation record; and not performing aggregation again on the second data set that has been aggregated, this embodiment is beneficial to improving reusability of data aggregation results, can effectively control resource consumption of data aggregation and improve aggregation efficiency of data aggregation, suitable for ultra-large-scale data aggregation work.

According to an embodiment of the present application, the present application also provides an electronic device and a readable storage medium.

Figure 5:
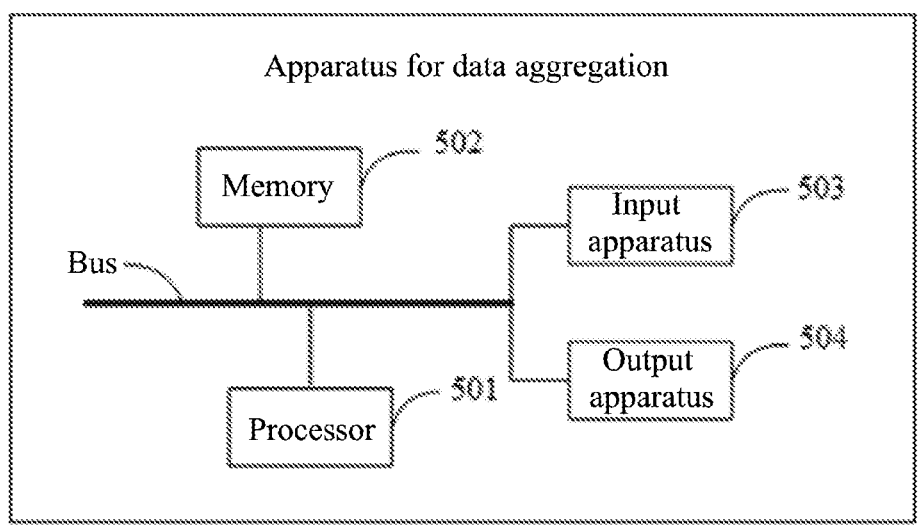
FIG. 5 is a schematic structural diagram of a device for data aggregation according to an embodiment of the present application.

As shown in FIG. 5, it is a block diagram of an electronic device for a method for data aggregation according to an embodiment of the present application. The electronic device is intended to represent various forms of digital computers, such as a laptop computer, a desktop computer, a workbench, a personal digital assistant, a server, a blade server, a mainframe computer, and other suitable computers. The electronic device can also represent various forms of mobile apparatus, such as a personal digital processing assistant, a cellular phone, a smart phone, a wearable device, and other similar computing apparatus. The components, their connections and relationships, and their functions herein are merely examples, and are not intended to limit an implementation of the application described and/or claimed herein.

As shown in FIG. 5, the electronic device includes: one or more processors 501, memories 502, and interfaces for connecting various components, including high-speed interfaces and low-speed interfaces. The components are connected to each other with different buses and can be installed on a common main board or in other ways as needed. The processor may process instructions executed within the electronic device, including instructions stored in or on the memory to display graphical information of GUI on an external input/output apparatus (such as a display device coupled to the interface). In other embodiments, if required, multiple processors and/or buses can be used with multiple memories. Similarly, multiple electronic devices can be connected, and each device provides some necessary operations (for example, as a server array, a group of blade servers, or a multi-processor system). In FIG. 5, one processor 501 is taken as an example.

The memory 502 is a non-transitory computer readable storage medium according to the present application. The memory is stored with instructions executable by at least one processor, so that the at least one processor executes the method for data aggregation according to the present application. The non-transitory computer readable storage medium of the present application is stored with computer instructions, the computer instructions are configured to enable a computer to execute the method for data aggregation according to the present application.

The memory 502 acting as a non-transitory computer-readable storage medium can be used to store a non-transitory software program, a non-transitory computer executable program and module, such as program instructions/a module corresponding to the method for data aggregation in the embodiments of the present application (For example, a first processing unit 1, a second processing unit 2, a third processing unit 3, a fourth processing unit 4, a fifth processing unit 5 shown in FIG. 3). The processor 501 executes various functional applications and data processing of the server by running the non-transitory software program, the instructions, and the module stored in the memory 502, that is, implementing the method for data aggregation in the foregoing method embodiments.

The memory 502 may include a program storage area and a data storage area, where the program storage area may be stored with an application program required by an operating system and at least one function; the data storage area may be stored with data created according to the use of the electronic device for data aggregation, and so on. In addition, the memory 502 may include a high-speed random access memory or a non-transitory memory, such as at least one magnetic disk storage device, a flash memory device, or other non-transitory solid-state storage devices. In some embodiments, the memory 502 includes memories remotely provided with respect to the processor 501, and these remote memories may be connected to the electronic device for data aggregation through a network. Examples of the above network include, but are not limited to, Internet, an intranet, a local area network, a mobile communication network, and a combination of them.

The electronic device of the method for data aggregation may further include: an input apparatus 503 and an output apparatus 504. The processor 501, the memory 502, the input apparatus 503, and the output apparatus 504 may be connected through a bus or in other ways. In FIG. 5, connection through a bus is used as an example.

The input apparatus 503 can receive input digital or character information, and generate a key signal input related to user settings and function control of the electronic device of the method for data aggregation, such as a touch screen, a keypad, a mouse, a track pad, a touch panel, an indicator stick, one or more mouse buttons, a trackball, a joystick and other input apparatus. The output apparatus 504 may include a display device, an auxiliary lighting apparatus (such as an LED), a tactile feedback apparatus (such as a vibration motor), and so on. The display device may include, but is not limited to, a liquid crystal display (LCD), a light emitting diode (LED) display, and a plasma display. In some embodiments, the display device may be a touch screen.

Various embodiments of the systems and techniques described herein may be implemented in a digital electronic circuitry, an integrated circuit system, a special-purpose ASIC (application-specific integrated circuit), computer hardware, firmware, software, and/or a combination of them. These various embodiments may include: implementations in one or more computer programs which may be executed and/or interpreted on a programmable system including at least one programmable processor. The programmable processor may be a special-purpose or general programmable processor, and may receive data and instructions from a storage system, at least one input apparatus, and at least one output apparatus, and transmit the data and instructions to the storage system, the at least one input apparatus, and the at least one output apparatus.

These computer programs (also known as programs, software, software applications, or codes) include machine instructions of the programmable processor, moreover, these computer programs may be implemented with a high-level process and/or an object-oriented programming language, and/or an assembly/machine language. As used herein, the terms "machine-readable medium" and "computer-readable medium" refer to any computer program product, device, and/or apparatus (for example, a magnetic disk, an optical disk, a memory, a programmable logic device (PLD)) used to provide machine instructions and/or data to the programmable processor, including the machine-readable medium that receives machine instructions as a machine-readable signal. The term "machine-readable signal" refers to any signal used to provide the machine instructions and/or data to the programmable processor.

In order to provide interaction with users, the systems and techniques described herein may be implemented on a computer, where the computer has: a display apparatus (for example, a CRT (cathode ray tube) or an LCD (liquid crystal display) monitor) for displaying information to users; and a keyboard and a pointing apparatus (for example, a mouse or a trackball) though which users may provide input to the computer. Other types of apparatus may also be used to: provide interaction with users; for example, the feedback provided to users may be any form of sensing feedback (for example, visual feedback, audible feedback, or tactile feedback); and the input from users may be received in any form (including sound input, voice input, or tactile input).

The systems and techniques described herein may be implemented in a computing system that includes a back end component (for example, a data server), or a computing system that includes a middleware component (for example, an application server), or a computing system that includes a front end component (for example, a user computer with a graphical user interface or a web browser, through which the user can interact with the implementations of the systems and techniques described herein), or a computing system that includes any combination of such back end component, middleware component, or front end component. System components may be connected to each other by any form or medium of digital data communication (for example, a communication network). Examples of the communication network include: a local area network (LAN), a wide area network (WAN), and Internet.

A computing system may include a client and a server. The client and the server are generally far from each other and usually perform interactions through a communication network. A relationship between the client and the server is generated by a computer program running on a corresponding computer and having a client-server relationship.

In the embodiments of the present application, the above embodiments may refer to each other for reference, and the same or similar steps and nouns will not be described again one by one for the sake of redundancy.

It should be understood that various forms of processes shown above can be used, and steps may be reordered, added, or deleted. For example, the steps described in the present application may be performed in parallel or sequentially or in different orders. As long as desired results of the technical solutions disclosed in the present application can be achieved, no limitation is made herein.

The above specific embodiments do not constitute a limitation to the protection scope of the present application. Persons skilled in the art should know that various modifications, combinations, sub-combinations and substitutions can be made according to design requirements and other factors. Any modification, equivalent replacement and improvement made within the spirit and principle of the present application shall be included in the protection scope of the present application.

What is claimed is:

1. A method for data aggregation, comprising:
acquiring original data to be aggregated and dividing the original data into at least one first data set;
determining whether each of the at least one first data set has a corresponding historical aggregation record;
when there is at least one second data set with a historical aggregation record in the at least one first data set, acquiring a historical aggregation result corresponding to each second data set to obtain at least one first aggregation result;
performing aggregation on each third data set without a historical aggregation record to obtain at least one second aggregation result; and
determining a third aggregation result of the original data according to the at least one first aggregation result and the at least one second aggregation result, and determining a data tag of the original data according to the third aggregation result;
wherein the dividing the original data into at least one first data set comprises:
establishing a first plan tree corresponding to the original data, the first plan tree comprising at least one first connection node and at least one first aggregation node, one leaf node of the first plan tree constituting one first aggregation node, and data represented by one first aggregation node constituting one first data set;
wherein the determining whether each of the at least one first data set has a corresponding historical aggregation record comprises:
determining whether a data attribute index of an aggregation record file is completely consistent with that of each of the at least one first aggregation node in a preset file path, wherein the data attribute index comprising a time attribute, a location attribute, a volume attribute, and a format attribute;
determining that the first aggregation node has a corresponding historical aggregation record when the data attribute index of the aggregation record file is completely consistent with that of the first aggregation node, to obtain at least one second aggregation node with a historical aggregation record in the first plan tree, data represented by one second aggregation node constituting one second data set; and
determining that the first aggregation node does not have a corresponding historical aggregation record when the data attribute index of the aggregation record file is not completely consistent with that of each of the at least one first aggregation node.

2. The method according to claim 1, wherein the establishing a first plan tree corresponding to the original data comprises:
acquiring a user-specified data metric for each aggregation in batch aggregation on the original data to constitute a data metric threshold for each of the at least one first data set;
determining a number of node levels of the first plan tree and the at least one first aggregation node according to the data metric threshold for each first data set; and
establishing the first plan tree according to the number of node levels and the at least one first aggregation node.

3. The method according to claim 1, wherein the performing aggregation on each third data set without a historical aggregation record to obtain at least one second aggregation result comprises:
performing trimming on the first plan tree according to the at least one second aggregation node of the first plan tree to obtain a second plan tree; and
performing aggregation on each of the at least one third data set according to the second plan tree to obtain at least one second aggregation result.

4. The method according to claim 3, wherein the performing trimming on the first plan tree according to the at least one second aggregation node of the first plan tree to obtain a second plan tree comprises:
  according to a file record corresponding to each second aggregation node and the at least one first connection node of the first plan tree, determining, in the file record, a highest-level first connection node corresponding to each second aggregation node to obtain at least one second connection node corresponding to the at least one second aggregation node; and
  deleting, in the first plan tree, a child node branch corresponding to each of the at least one second connection node to obtain the second plan tree.

5. An apparatus for data aggregation, comprising:
  at least one processor; and
  a memory communicatively connected to the at least one processor;
  wherein the memory is stored with instructions executable by the at least one processor, and the instructions are executed by the at least one processor to enable the at least one processor to:
  acquire original data to be aggregated and divide the original data into at least one first data set;
  determine whether each of the at least one first data set has a corresponding historical aggregation record;
  when there is at least one second data set with a historical aggregation record in the at least one first data set, acquire a historical aggregation result corresponding to each second data set to obtain at least one first aggregation result;
  perform aggregation on each third data set without a historical aggregation record to obtain at least one second aggregation result; and
  determine a third aggregation result of the original data according to the at least one first aggregation result and the at least one second aggregation result, and determine a data tag of the original data according to the third aggregation result;
  wherein the at least one processor is further configured to:
  establish a first plan tree corresponding to the original data, the first plan tree comprising at least one first connection node and at least one first aggregation node, one leaf node of the first plan tree constituting one first aggregation node, and data represented by one first aggregation node constituting one first data set;
  wherein the at least one processor is further configured to:
  determine whether a data attribute index of an aggregation record file is completely consistent with that of each of the at least one first aggregation node in a preset file path, wherein the data attribute index comprising a time attribute, a location attribute, a volume attribute, and a format attribute;
  determine that the first aggregation node has a corresponding historical aggregation record when the data attribute index of the aggregation record file is completely consistent with that of each of the at least one first aggregation node, to obtain at least one second aggregation node with a historical aggregation record in the first plan tree, data represented by one second aggregation node constituting one second data set; and
  determine that the first aggregation node does not have a corresponding historical aggregation record when the data attribute index of the aggregation record file is not completely consistent with that of each of the at least one first aggregation node.

6. The apparatus according to claim 5, wherein the at least one processor is further configured to:
  acquire a user-specified data metric for each aggregation in batch aggregation on the original data to constitute a data metric threshold for each of the at least one first data set;
  determine a number of node levels of the first plan tree and the at least one first aggregation node according to the data metric threshold for each first data set; and
  establish the first plan tree according to the number of node levels and the at least one first aggregation node.

7. The apparatus according to claim 5, wherein the at least one processor is further configured to:
  perform trimming on the first plan tree according to the at least one second aggregation node of the first plan tree to obtain a second plan tree; and
  perform aggregation on each of the at least one third data set according to the second plan tree to obtain at least one second aggregation result.

8. The apparatus according to claim 7, wherein the at least one processor is further configured to:
  according to a file record corresponding to each second aggregation node and the at least one first connection node of the first plan tree, determine, in the file record, a highest-level first connection node corresponding to each second aggregation node to obtain at least one second connection node corresponding to the at least one second aggregation node; and
  delete, in the first plan tree, a child node branch corresponding to each of the at least one second connection node to obtain the second plan tree.

9. A non-transitory computer readable storage medium stored with computer instructions, wherein the computer instructions are configured to enable a computer to execute the following steps:
  acquiring original data to be aggregated and dividing the original data into at least one first data set;
  determining whether each of the at least one first data set has a corresponding historical aggregation record;
  when there is at least one second data set with a historical aggregation record in the at least one first data set, acquiring a historical aggregation result corresponding to each second data set to obtain at least one first aggregation result;
  performing aggregation on each third data set without a historical aggregation record to obtain at least one second aggregation result; and
  determining a third aggregation result of the original data according to the at least one first aggregation result and the at least one second aggregation result, and determining a data tag of the original data according to the third aggregation result;
  wherein the dividing the original data into at least one first data set comprises:
  establishing a first plan tree corresponding to the original data, the first plan tree comprising at least one first connection node and at least one first aggregation node, one leaf node of the first plan tree constituting one first aggregation node, and data represented by one first aggregation node constituting one first data set;
  wherein the determining whether each of the at least one first data set has a corresponding historical aggregation record comprises:
  determining whether a data attribute index of an aggregation record file is completely consistent with that of each of the at least one first aggregation node in a preset file path, wherein the data attribute index comprising a time attribute, a location attribute, a volume attribute, and a format attribute;

determining that the first aggregation node has a corresponding historical aggregation record when the data attribute index of the aggregation record file is completely consistent with that of the first aggregation node, to obtain at least one second aggregation node with a historical aggregation record in the first plan tree, data represented by one second aggregation node constituting one second data set; and determining that the first aggregation node does not have a corresponding historical aggregation record when the data attribute index of the aggregation record file is not completely consistent with that of each of the at least one first aggregation node.

10. The non-transitory computer readable storage medium according to claim 9, wherein the computer instructions are further configured to enable the computer to execute the following steps:

acquiring a user-specified data metric for each aggregation in batch aggregation on the original data to constitute a data metric threshold for each of the at least one first data set;

determining a number of node levels of the first plan tree and the at least one first aggregation node according to the data metric threshold for each first data set; and establishing the first plan tree according to the number of node levels and the at least one first aggregation node.

11. The non-transitory computer readable storage medium according to claim 9, wherein the computer instructions are further configured to enable the computer to execute the following steps:

performing trimming on the first plan tree according to the at least one second aggregation node of the first plan tree to obtain a second plan tree; and performing aggregation on each of the at least one third data set according to the second plan tree to obtain at least one second aggregation result.

12. The non-transitory computer readable storage medium according to claim 11, wherein the computer instructions are further configured to enable the computer to execute the following steps:

according to a file record corresponding to each second aggregation node and the at least one first connection node of the first plan tree, determining, in the file record, a highest-level first connection node corresponding to each second aggregation node to obtain at least one second connection node corresponding to the at least one second aggregation node; and deleting, in the first plan tree, a child node branch corresponding to each of the at least one second connection node to obtain the second plan tree.

\* \* \* \* \*